United States Patent
Baudisch et al.

(10) Patent No.: US 12,351,071 B2
(45) Date of Patent: Jul. 8, 2025

(54) METHOD AND CONTROL DEVICE FOR TEMPERATURE CONTROL OF A TRACTION BATTERY OF AN ELECTRICALLY POWERED MOTOR VEHICLE

(71) Applicant: Bayerische Motoren Werke Aktiengesellschaft, Munich (DE)

(72) Inventors: Sebastian Baudisch, Munich (DE); Simone Fuchs, Munich (DE); Harald Hofmeier, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 610 days.

(21) Appl. No.: 17/777,092

(22) PCT Filed: Dec. 2, 2020

(86) PCT No.: PCT/EP2020/084285
§ 371 (c)(1),
(2) Date: May 16, 2022

(87) PCT Pub. No.: WO2021/122003
PCT Pub. Date: Jun. 24, 2021

(65) Prior Publication Data
US 2022/0396176 A1 Dec. 15, 2022

(30) Foreign Application Priority Data
Dec. 16, 2019 (DE) .................. 10 2019 134 615.0

(51) Int. Cl.
*B60L 58/24* (2019.01)
*B60L 3/12* (2006.01)
(Continued)

(52) U.S. Cl.
CPC .............. *B60L 58/24* (2019.02); *B60L 3/12* (2013.01); *B60L 53/66* (2019.02); *B60L 58/12* (2019.02);
(Continued)

(58) Field of Classification Search
CPC ........... B60L 2240/545; B60L 2240/60; B60L 2250/18; B60L 2260/54; B60L 2260/56;
(Continued)

(56) References Cited

U.S. PATENT DOCUMENTS 5,548,200 A * 8/1996 Nor .................. B60L 53/11
320/132
8,417,403 B2 * 4/2013 Iida .................. H01M 10/63
903/903

(Continued)

FOREIGN PATENT DOCUMENTS

CN 101778732 A 7/2010
CN 102725182 A 10/2012
(Continued)

OTHER PUBLICATIONS

Chinese-language Office Action issued in Chinese Application No. 202080072168.7 dated Oct. 11, 2023 with English translation (14 pages).
(Continued)

*Primary Examiner* — Tyler J Lee
(74) *Attorney, Agent, or Firm* — Crowell & Moring LLP

(57) ABSTRACT

A method for temperature control of a traction battery includes predefining a target temperature which the traction battery should have at the end of a journey and upon arrival at a fast-charging station; predicting a temperature which the traction battery will have at the end of the journey and upon arrival at the fast-charging station; determining a temperature difference between the target temperature and the pre-
(Continued)

dicted temperature; predefining a temperature control specification for temperature control of the traction battery during the journey of the motor vehicle to the fast-charging station in accordance with the determined temperature difference, so that the target temperature prevails upon arrival at the fast-charging station; and controlling the temperature of the traction battery according to the predetermined temperature control specification during the journey of the vehicle.

10 Claims, 1 Drawing Sheet

(51) Int. Cl.
| | | |
|---|---|---|
| *B60L 53/66* | (2019.01) | |
| *B60L 58/12* | (2019.01) | |
| *H01M 10/48* | (2006.01) | |
| *H01M 10/62* | (2014.01) | |
| *H01M 10/625* | (2014.01) | |
| *H01M 10/63* | (2014.01) | |

(52) U.S. Cl.
CPC ....... *H01M 10/486* (2013.01); *H01M 10/625* (2015.04); *H01M 10/63* (2015.04); *B60L 2240/545* (2013.01); *B60L 2240/60* (2013.01); *B60L 2250/18* (2013.01); *B60L 2260/54* (2013.01); *B60L 2260/56* (2013.01); *H01M 2220/20* (2013.01)

(58) Field of Classification Search
CPC ........ B60L 2260/58; B60L 3/12; B60L 53/11; B60L 53/66; H01M 10/486; H01M 10/625; H01M 10/63; H01M 2220/02; Y02E 60/10; Y02T 10/70; Y02T 10/72; Y02T 90/12; Y02T 90/16; Y04S 30/14
See application file for complete search history.

(56) References Cited

U.S. PATENT DOCUMENTS

| | | | | |
|---|---|---|---|---|
| 8,948,952 | B2* | 2/2015 | Niimi | B60W 10/26 |
| | | | | 701/22 |
| 9,290,108 | B2* | 3/2016 | Payne | G01C 21/3461 |
| 9,403,527 | B2* | 8/2016 | Magnet | B60W 30/192 |
| 9,455,481 | B2* | 9/2016 | Soga | H01M 10/486 |
| 10,286,807 | B2* | 5/2019 | Christen | H01M 10/63 |
| 2004/0251870 | A1* | 12/2004 | Ueda | B60L 53/11 |
| | | | | 320/104 |
| 2005/0099154 | A1* | 5/2005 | Ohnuma | B60L 3/0046 |
| | | | | 320/107 |
| 2010/0324765 | A1* | 12/2010 | Iida | B60L 15/2045 |
| | | | | 701/22 |
| 2012/0280050 | A1 | 11/2012 | Tonozuka et al. | |
| 2015/0100188 | A1 | 4/2015 | Wagner et al. | |
| 2017/0179512 | A1 | 6/2017 | Eschenbach et al. | |
| 2018/0072181 | A1 | 3/2018 | Christen et al. | |
| 2018/0361872 | A1 | 12/2018 | Zhou | |
| 2021/0188127 | A1 | 6/2021 | Klose et al. | |

FOREIGN PATENT DOCUMENTS

| | | |
|---|---|---|
| CN | 106458036 A | 2/2017 |
| CN | 107825967 A | 3/2018 |
| CN | 109103525 A | 12/2018 |
| DE | 10 2012 204 410 A1 | 9/2013 |
| DE | 10 2014 017 989 A1 | 7/2015 |
| DE | 10 2017 210 303 B3 | 11/2018 |
| DE | 10 2017 221 829 B3 | 4/2019 |
| EP | 2 177 389 A1 | 4/2010 |
| EP | 2 529 979 A1 | 12/2012 |

OTHER PUBLICATIONS

Chinese-language Office Action issued in Chinese Application No. 202080072168.7 dated Jun. 1, 2023 with English translation (15 pages).
International Search Report (PCT/ISA/210) issued in PCT Application No. PCT/EP2020/084285 dated Mar. 5, 2021 with English translation (five (5) pages).
German-language Written Opinion (PCT/ISA/237) issued in PCT Application No. PCT/EP2020/084285 dated March 5. 2021 (six (6) pages).
German-language Search Report issued in German Application No. 10 2019 134 615.0 dated Dec. 10, 2020 with partial English translation (12 pages).

* cited by examiner

METHOD AND CONTROL DEVICE FOR TEMPERATURE CONTROL OF A TRACTION BATTERY OF AN ELECTRICALLY POWERED MOTOR VEHICLE

BACKGROUND AND SUMMARY OF THE INVENTION

The present invention relates to a method and a control device for the temperature control of a traction battery of an electrically-powered motor vehicle. The invention further relates to an electrically-powered motor vehicle having a control device of this type.

It is known per se that traction batteries for electrically-powered motor vehicles usually only operate with a high degree of efficiency within a specific temperature range, if the traction battery is not to be exposed to the risk of damage. In many cases, this temperature range is of the order of approximately 25 to 50 degrees Celsius. Thus, for example, DE 10 2014 017 989 A1 describes a variety of problems which can occur when a traction battery for an electrically-powered motor vehicle, which is configured as a high-voltage battery, is operated outside its target temperature range. Inter alia, it is described that, by their design, battery cells at low temperatures show a lower capacity and a lower power capability than at their optimum service temperature. It is therefore customary to provide a battery heating system by way of which, if required, the traction battery of the relevant electrically-powered motor vehicle can be temperature-controlled to an ideally optimum service temperature.

The object of the present invention is the provision of a solution, by way of which a rapid charging process of a traction battery of an electrically-powered motor vehicle can be executed in a particularly effective manner.

This object is fulfilled by a method, and by a control device for the temperature control of a traction battery of an electrically-powered motor vehicle according to the claimed invention.

In the method according to an embodiment of the invention for the temperature control of a traction battery of an electrically-powered motor vehicle, a target temperature is predefined which the traction battery is intended to assume, at the end of a journey, upon arrival at a rapid charging station. The target temperature can be predefined, for example, in accordance with the external temperature, in accordance with a foreseeable quantity of energy to be charged at the rapid charging station and/or in accordance with a foreseeable residual range upon arrival at the charging column. If a driver of the electrically-powered motor vehicle, for example, has entered a target destination, the navigation system of the motor vehicle, for example, can identify rapid charging stations along the route, such that it is known which of the rapid charging stations is to be reached, for example for the charging of the traction battery. Particularly in the case of long journeys, it is desirable that a driver of the electrically-powered motor vehicle, if required, is able to recharge the traction battery in a particularly rapid manner, in order to permit the prompt resumption of their planned journey.

If it is known at what point along the route to be travelled the above-mentioned rapid charging station at which the traction battery is to be charged is located, a temperature is predicted which the traction battery will assume, in the absence of temperature control, at the end of the journey upon arrival at the rapid charging station. For the predicting of this temperature, a wide variety of data can be provided, which will permit the determination or estimation of the temperature which will be assumed by the traction battery, in the absence of temperature control, at the end of the journey upon arrival at the rapid charging station.

Once this temperature has been predicted, a temperature difference between the predefined target temperature and the predicted temperature of the traction battery is determined. Accordingly, the degree to which, for example, the achievable temperature of the traction battery in the absence of temperature control will be lower than the target temperature is known, if the rapid charging station is approached in the absence of any temperature control of the traction battery. Depending upon the temperature difference thus determined, a temperature control instruction for the temperature control of the traction battery during the journey of the motor vehicle to the rapid charging station is defined such that, upon arrival at a rapid charging station, the target temperature is achieved. During the journey of the motor vehicle to the rapid charging station, the traction battery is then temperature-controlled in accordance with the defined temperature control instruction.

The invention is particularly based upon the knowledge whereby, particularly in the event of low external temperatures, temperature control of the traction battery is desirable, if the latter is to be charged as rapidly as possible at a rapid charging station which is located along a route to be travelled. In many cases, at low temperatures of the traction battery, charging is in particular more critical than the discharging of the traction battery. Particularly in the event of long journeys with planned rapid charging stops, at low external temperatures, a driver of the electrically-powered motor vehicle can benefit from the method according to an embodiment of the invention, wherein the traction battery is reliably and promptly heated to its target temperature, such that this target temperature is present when the relevant rapid charging station is reached. Upon arrival at the above-mentioned rapid charging station, the traction battery can thus be charged particularly rapidly, and without damage to the traction battery, as the latter assumes a temperature which permits an optimum charging process.

According to a potential configuration of the invention, it is provided that the traction battery is temperature-controlled, in accordance with the temperature control instruction, with effect from the start of travel to the rapid charging station. It can thus be provided that, for example, in a first third of the route to the rapid charging station, the traction battery undergoes heat-up, whereafter the traction battery, as a result of its heat output, is further heated to the extent that the exact target temperature is achieved upon arrival at the rapid charging station. By the prompt heat-up of the traction battery, with effect from the start of travel, the traction battery can be brought to an optimum operating state or an optimum service temperature in a particularly rapid manner. This can be advantageous, particularly at low external temperatures. Accordingly, the traction battery can already be operated with a high degree of efficiency, and with no damage to the traction battery, shortly after the start of travel, wherein it can simultaneously be ensured that, upon arrival at the rapid charging station, the traction battery has achieved its target temperature. However, in the event of heat-up with effect from the start of travel, a fundamental compromise between energy consumption and driving performance will need to be identified in all cases, in the event that no target input is defined.

According to a further potential configuration of the invention, it is provided that, for the temperature control of the traction battery, an electric drive machine which is employed for the propulsion of the motor vehicle is operated at a lower efficiency than a maximum potential construction-related efficiency of the electric drive machine. A procedure of this type is also described as the "trimming" of the electric drive machine. Accordingly, the electric drive machine which is employed for the propulsion of the motor vehicle is deliberately operated in a sub-optimum efficiency range, as a result of which a higher heat output or generation of heat occurs in the electric drive machine. The additional heat thus released can then be simply employed for the temperature control of the traction battery. However, alternatively or additionally to the trimming of the electric drive machine, it can also be provided that the traction battery undergoes heat-up by different components, for example by way of an above-mentioned coolant circuit or by other components such as, for example, a separate battery heating system or similar.

In a further potential configuration of the invention, it is provided that a power loss of the traction battery is estimated which will occur during the travel of the motor vehicle to the rapid charging station, wherein, in consideration of the power loss, the temperature of the traction battery is predicted, which temperature will be assumed by the traction battery, in the absence of temperature control, upon arrival at the rapid charging station. In the knowledge of the power loss of the traction battery, it is possible, in a particularly simple and reliable manner, to estimate or determine the extent to which the traction battery will have undergone heat-up during the travel of the motor vehicle to the rapid charging station, even in the absence of any additional temperature control or heat-up of the traction battery. By the estimation of the power loss of the traction battery it is thus possible, in a relatively reliable manner, to estimate the temperature which will be assumed by the traction battery upon arrival at the rapid charging station, in the absence of any additional temperature control, particularly any heat-up of the traction battery. Moreover, it is also possible to consider power losses from other components of the motor vehicle, in order to estimate the temperature which will be assumed by the traction battery upon arrival at the rapid charging station, in the absence of additional temperature control. It is thus possible, for example, to consider an overall thermodynamic energy balance, in order to estimate the heat-up of the traction battery in a particularly accurate manner. Measured values and/or previously executed simulations of specific driving profiles can be employed for this purpose. By the employment of an overall thermodynamic model, it is thus possible, for example, to determine the heat-up of the traction battery, specifically the heat-up which would have occurred in the absence of any additional temperature control of the traction battery by way of a battery heating system, or similar. Additionally or alternatively to the input of heat to the traction battery resulting from the power loss, it can be estimated how much heat, e.g. by way of convection cooling at the base of the vehicle, is evacuated from the traction battery to the environment. This evacuation of heat to the environment can then be considered in the predicting of the temperature of the traction battery which will be assumed by the traction battery, in the absence of temperature control, further to travel and upon arrival at the rapid charging station.

According to a further potential configuration of the invention, it is provided that the heat-up of the traction battery is suspended or delayed if it is determined, by reference to at least one criterion, that any heat-up of the traction battery is not necessary. This can also occur independently of whether or if a rapid charging station is being approached, e.g. it can be predicted how long a journey will last and/or how much power will foreseeably need to be delivered by way of the traction battery during travel. If the journey is not of sufficient length to permit the achievement of a stipulated service temperature and/or only a small quantity of power is foreseeably required, heat-up of the traction battery can be suspended or delayed. Alternatively or additionally, it can also be estimated when the delivery of a high capacity is required. If it is detected or predicted that the delivery of a high capacity by the traction battery will only be required once the traction battery has generated its own heat-up, any heating of the traction battery can likewise be delayed or suspended. For the estimation as to whether and, where applicable, when the traction battery is required to undergo heat-up, for example, a learned driving behavior of a driver can also be taken into consideration. For example, a driving profile can be constituted which, over time, contains an increasing quantity of information as to how the driver drives the vehicle, e.g. in a particularly dynamic or efficient manner. Over time, it can be predicted with increasing reliability how the driver will drive the vehicle and thus, additionally, how much power the traction battery is required to deliver, and when. The at least one criterion can include e.g. the fact that no rapid charging station at all is being approached. Moreover, the at least one criterion can also include the fact that the driving behavior of the relevant driver is such that the power delivered by way of the battery need not be of such magnitude that heat-up would be required. Alternatively, the loading of the battery, for example, will only occur at a sufficiently late point in time, when the battery has already achieved an appropriate service temperature.

According to a further potential configuration of the invention, it is provided that route data for the journey of the motor vehicle to the rapid charging station are delivered wherein, in consideration of the route data, the temperature of the traction battery is predicted, which temperature will be assumed by the traction battery, in the absence of temperature control, upon arrival at the rapid charging station. The route data can include, for example, a gradient profile of the relevant route. Additionally, for example, the route data can also include speed limits such that, by reference to these data, it can be estimated how much power the traction battery will be required to deliver along respective sections of the route, particularly for the propulsion of the motor vehicle.

The route data, for example, can moreover include weather data such that, in the knowledge of the weather data, particularly temperature data, the degree to which the traction battery will require heat-up along the route to the rapid charging station, particularly in the absence of any additional temperature control of the traction battery, can be estimated in a particularly accurate manner.

According to a further potential configuration of the invention, it is provided that driver data which characterize the driving behavior of a driver of the motor vehicle are delivered, in consideration of which driver data the temperature which will be assumed by the traction battery, in the absence of temperature control, upon arrival at the rapid charging station is predicted. It is possible, for example, for driver profiles to be constituted for one or more drivers of the motor vehicle, in which the manner in which the respective driver drives the motor vehicle is saved. In particular, the driving behavior of a driver has a relatively major influence upon how much power is required of the traction battery, and the extent to which the latter undergoes heat-up during driving operation. In the knowledge of these driver data, it is possible to determine the heat-up of the traction battery during the journey to the rapid charging station in a particularly reliable manner.

According to a further potential configuration of the invention, it is provided that an initial temperature of the traction battery, prior to the start of travel to the rapid charging station, is determined, wherein, in consideration of the initial temperature, the temperature of the traction battery is predicted which will be assumed by the traction battery, in the absence of temperature control, upon arrival at the rapid charging station. The temperature of the traction battery which is present before the start of travel, i.e. the initial temperature, is also an important factor in the determination of the temperature of the traction battery which will be assumed upon arrival at the rapid charging station, in the absence of additional temperature control.

According to a further potential configuration of the invention, it is provided that a duration of travel to the rapid charging station is estimated, wherein, in consideration of the duration of travel, the temperature of the traction battery is predicted which will be assumed by the traction battery, in the absence of temperature control, upon arrival at the rapid charging station. Thus, for example, navigation data, data from digital card hardware, swarm data from other vehicles or similar, can be employed for the estimation of the duration of travel to the rapid charging station in a particularly accurate manner. In the knowledge of the duration of travel, it is possible, in a particularly reliable manner, to estimate or determine the extent to which the traction battery will undergo heat-up pending arrival at the rapid charging station, in order thus to determine the temperature of the traction battery, which temperature will be assumed by the traction battery, in the absence of temperature control, upon arrival at the rapid charging station.

The control device according to an embodiment of the invention for the temperature control of a traction battery of an electrically-powered motor vehicle is designed to execute the method according to an embodiment of the invention, or potential configurations of the method according to the invention. Potential configurations of the method according to the invention are to be considered as potential configurations of the control device, and vice versa, wherein the control device particularly comprises components for the execution of the method steps. In particular, it is also possible that a heating requirement for a vehicle interior is estimated. The estimated heating requirement—insofar as any temperature control of the vehicle interior influences heating capacity which is available for the temperature control of the traction battery—can be considered, in order to estimate the extent to which temperature control of the traction battery is possible in any event. To this end, e.g. learned data or user profiles can be made available to the control device, which characterize customary heating settings at associated external temperatures.

The electrically-powered motor vehicle according to an embodiment of the invention comprises the control device according to an embodiment of the invention and a potential configuration of the control device according to the invention.

Further features of the invention proceed from the claims, the figures and the description of the figures. The features and combinations of features specified above in the description and the features and combinations of features shown hereinafter in the description of the figures and/or in the figures alone can not only be applied in the respective combination indicated, but also in other combinations, or in isolation, without departing from the scope of the invention.

DETAILED DESCRIPTION OF THE DRAWINGS

In the figures, identical and functionally equivalent elements are represented by the same reference symbols.

Figure 1:
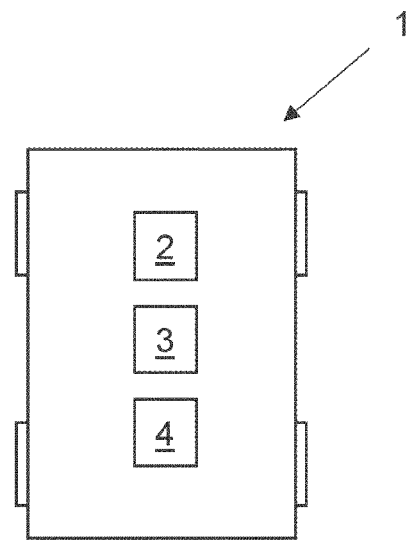
FIG. 1 shows a highly schematic representation of an electrically-powered motor vehicle.

An electrically-powered motor vehicle 1 is shown in a highly schematic representation in FIG. 1. The motor vehicle 1 comprises inter alia a traction battery 2, an electric drive machine 3 and a control device 4. In a manner which is known per se, the traction battery 2 is employed, inter alia, for the supply of energy to the electric drive machine 3 which, in turn, propels the motor vehicle 1. The control device 4 is designed to execute a temperature control of the traction battery 2, which is described in greater detail hereinafter, during the travel of the motor vehicle 1.

Particularly during long journeys, it can occur that the traction battery 2 requires recharging. Customarily, it is thus desirable that the traction battery 2 can be charged in a particularly rapid manner, in order to permit a particularly prompt resumption by a driver of their journey in the motor vehicle 1. The potential power take-up of the traction battery 2 during a rapid charging process is strongly influenced, inter alia, by the temperature of the traction battery 2. Customarily, the traction battery 2 should lie within a temperature range between 15 degrees Celsius and 35 degrees Celsius, such that the traction battery 2 can be charged without damage, and in a particularly rapid manner. However, particularly at low ambient temperatures, it can occur that the traction battery 2 lies below this temperature window.

A method for the temperature control of the traction battery 2 is described in greater detail hereinafter, with reference to FIG. 2. In the diagram, various temperature characteristics 6, 7, 8 of the traction battery 2 along a route s, pending arrival at a rapid charging station 5, are plotted schematically. Before the driver departs in the motor vehicle 1, a target temperature $T_1$ can be predefined, which the traction battery 2 is intended to achieve, after travel, upon arrival at the rapid charging station 5. The target temperature $T_1$ is selected such that the traction battery 2 can be charged without damage, and in a particularly rapid manner, by way of the rapid charging station 5. Additionally, a temperature $T_2$ is predicted, which the traction battery 2 will or would assume after travel, in the absence of temperature control, upon arrival at the rapid charging station 5. The temperature characteristic 6 characterizes the temperature movement of the traction battery 2 along the route s pending arrival at the rapid charging station 5, in the event that the traction battery 2 is not additionally subject to temperature control or heat-up. In the knowledge of the target temperature $T_1$ and the temperature $T_2$, which would be achieved in the absence of additional temperature control, a temperature difference $T_3$ is determined, i.e. the difference between the target temperature $T_1$ and the temperature $T_2$.

In the knowledge of the temperature difference $T_3$, a temperature control instruction for the temperature control of the traction battery 2 during the journey to the rapid charging station 5 is defined, such that the target temperature $T_1$ will be achieved upon arrival at the rapid charging station 5. Following the start of travel to the rapid charging station 5, the traction battery 2 is correspondingly temperature-controlled in accordance with the defined temperature control instruction, such that the target temperature $T_1$ is achieved upon arrival at the rapid charging station 5. The above-mentioned process steps can be executed by the control device 4. The control device 4 is thus designed and configured for the execution of the above-mentioned process steps.

Figure 2:
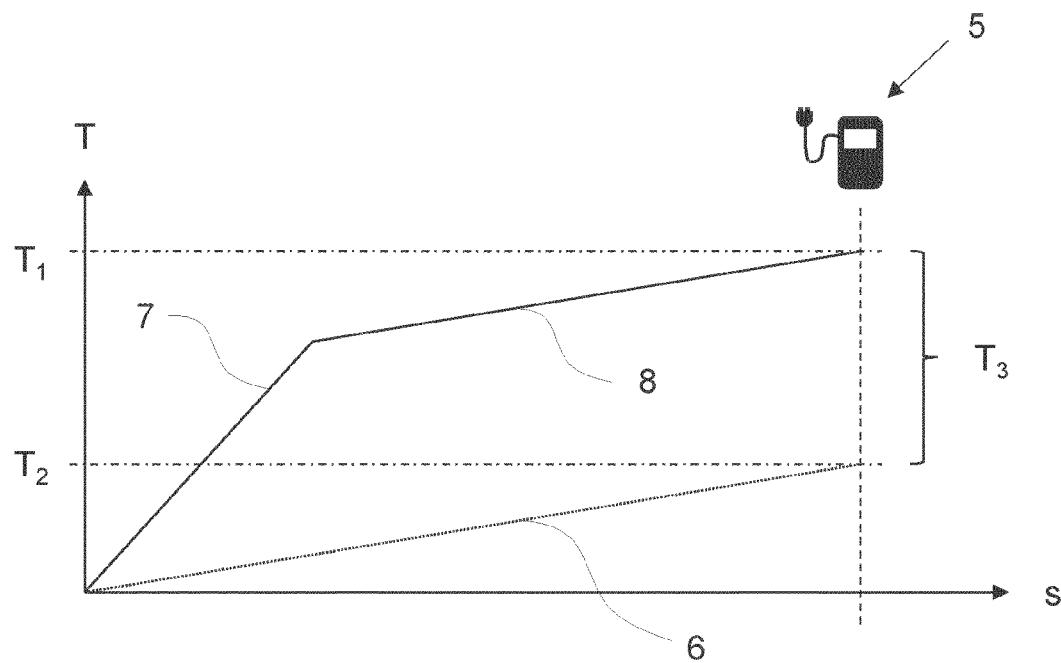
FIG. 2 shows a diagram in which different temperature characteristics of a traction battery of the motor vehicle, pending arrival at a rapid charging station, are represented.

According to the diagram represented in FIG. 2, the traction battery 2 is temperature-controlled in accordance with the temperature control instruction with immediate effect from the start of travel to the rapid charging station 5. This can be seen from the temperature characteristic 7, which shows a substantially steeper gradient than the temperature characteristic 6. Depending upon the length of the route s, and other marginal conditions, it can thus be provided that the traction battery 2 undergoes heat-up immediately after departure. The traction battery 2 can thus be heated to an ideally optimum service temperature immediately after departure, in a particularly rapid manner. The traction battery 2 can thus be operated within a particularly effective efficiency range, and delivers an effective power output, with no resulting damage to the traction battery 2.

The temperature characteristic 8 then characterizes that part of the travelled route s to the rapid charging station 5 in which the traction battery 2 is no longer subject to additional temperature control or heat-up. In the present case, the temperature characteristics 6, 8 are plotted with equal gradients, although this is not necessarily the case.

For the temperature control or heat-up of the traction battery 2, it can be provided, for example, that the electric drive machine 3 is operated in an efficiency range which is inferior to a construction-related maximum potential efficiency of the electric drive machine 3. By way of the "trimming" of the electric drive machine 3, for example directly after the start of travel, it is possible to generate surplus heat which, in turn, can be employed for the heat-up of the traction battery 2. Alternatively or additionally, for example, it is also possible to employ a coolant circuit for the temperature control of the traction battery 2. Other options for the heat-up of the traction battery 2 are also additionally or alternatively possible.

In order to estimate the temperature characteristic 6, and thus the temperature Ta, it is possible, for example, to estimate a power loss of the traction battery 2 which will occur during the journey of the motor vehicle 1 to the rapid charging station 5. In consideration of this estimated power loss, it is possible to determine, in a relatively accurate manner, the temperature $T_2$ which will be assumed by the traction battery 2, in the absence of temperature control, upon arrival at the rapid charging station 5. Consideration can also be given to power losses on other components of the motor vehicle 1 which, for example by way of thermal transfer, can heat up the traction battery 2. In particular, it is also possible to constitute a form of overall energy balance, which can be based upon measurements and/or simulations, in order to estimate or determine how the temperature characteristic 6 will progress, and ultimately also to then determine the temperature $T_2$ which will be assumed by the traction battery 2 upon arrival at the rapid charging station 5, if the traction battery 2 does not undergo any additional heat-up.

Route data for the route s can also be delivered to the control device 4, for example data on a gradient profile, weather data, speed limits or similar. In the knowledge of the route data, it is possible for the temperature $T_2$ of the traction battery 2 to be determined in a particularly accurate manner.

Moreover, it is also possible to deliver characteristic data for the driving behavior of the driver of the motor vehicle 1. Thus, for example, a driver profile can be progressively constituted and managed, which describes or characterizes how the relevant driver drives the motor vehicle 1. In the knowledge of the customary driving behavior of the driver, it is possible to estimate or determine the temperature characteristic 6 in a particularly accurate manner, such that the temperature $T_2$ can likewise be predicted in a particularly accurate manner.

Moreover, an initial temperature of the traction battery 2 can also be considered, which is present before the start of travel, or upon the start of travel to the rapid charging station 5. In consideration of the initial temperature of the traction battery 2, it is likewise possible to determine the temperature characteristic 6 and thus, additionally, the temperature $T_2$.

Moreover, it is also possible for a duration of travel to the rapid charging station 5 to be estimated. In the knowledge of the duration of travel, and further parameters such as, for example, the external temperature or similar, it is possible for the temperature characteristic 6 of the traction battery 2, and thus the temperature $T_2$, to be determined in a particularly accurate manner.

By way of the method thus described for the temperature control of the traction battery 2 en route to the rapid charging station 5, it is possible for the traction battery 2 to undergo prompt heat-up, such that it achieves its target temperature $T_1$. It can thus be ensured, upon arrival at the rapid charging station 5, that the traction battery 2 can be charged in a particularly rapid manner, with no resulting damage.

LIST OF REFERENCE SYMBOLS

1 Electrically-powered motor vehicle
2 Traction battery
3 Electric drive machine
4 Control device
5 Rapid charging station
6 Temperature characteristic
7 Temperature characteristic
8 Temperature characteristic
s Route
$T_1$ Target temperature
$T_2$ Temperature assumed by the traction battery upon arrival at the rapid charging station, in the absence of temperature control
$T_3$ Temperature difference between the target temperature and the temperature assumed by the traction battery upon arrival at the rapid charging station 5, in the absence of temperature control

What is claimed is:

1. A method for temperature control of a traction battery of an electrically-powered motor vehicle, the method comprising:
predefining a target temperature which the traction battery is intended to assume at an end of a journey, upon arrival at a rapid charging station;
predicting a predicted temperature which the traction battery will assume at the end of the journey, upon arrival at the rapid charging station, without the temperature control;
determining a temperature difference between the target temperature and the predicted temperature of the traction battery;

defining a temperature control instruction for the temperature control of the traction battery during the journey of the motor vehicle to the rapid charging station, in accordance with the temperature difference, such that the target temperature is achieved upon arrival at the rapid charging station; and controlling a temperature of the traction battery in accordance with the temperature control instruction during the journey of the motor vehicle to the rapid charging station.

2. The method according to claim 1, wherein the traction battery is temperature-controlled, in accordance with the temperature control instruction, from a start of travel to the rapid charging station.

3. The method according to claim 1, wherein:

heat-up of the traction battery is suspended or delayed if it is determined, by reference to at least one criterion, that any heat-up of the traction battery is not necessary.

4. The method according to claim 1, further comprising:

estimating a power loss of the traction battery which will occur during the travel of the motor vehicle to the rapid charging station, wherein the predicted temperature of the traction battery is predicted in consideration of the power loss.

5. The method according to claim 1, further comprising:

delivering route data for the journey of the motor vehicle to the rapid charging station, wherein the predicted temperature of the traction battery is predicted in consideration of the route data.

6. The method according to claim 1, further comprising:

delivering driver data which characterize driving behavior of a driver of the motor vehicle, wherein the predicted temperature of the traction battery is predicted in consideration of the driver data.

7. The method according to claim 1, further comprising:

determining an initial temperature of the traction battery prior to the start of travel to the rapid charging station, wherein the predicted temperature of the traction battery is predicted in consideration of the initial temperature.

8. The method according to claim 1, further comprising:

estimating a duration of travel to the rapid charging station, wherein the predicted temperature of the traction battery is predicted in consideration of the duration of travel.

9. A control device for temperature control of the traction battery of the electrically-powered motor vehicle, wherein the control device is configured to execute the method according to claim 1.

10. An electrically-powered motor vehicle comprising:

a control device that is configured to predefine a target temperature which the traction battery is intended to assume at an end of a journey, upon arrival at a rapid charging station;

predict a predicted temperature which the traction battery will assume at the end of the journey, upon arrival at the rapid charging station, without the temperature control;

determine a temperature difference between the target temperature and the predicted temperature of the traction battery;

define a temperature control instruction for the temperature control of the traction battery during the journey of the motor vehicle to the rapid charging station, in accordance with the temperature difference, such that the target temperature is achieved upon arrival at the rapid charging station; and control a temperature of the traction battery in accordance with the temperature control instruction during the journey of the motor vehicle to the rapid charging station.

* * * * *